(12) United States Patent
Potrebic et al.

(10) Patent No.: US 7,773,859 B1
(45) Date of Patent: Aug. 10, 2010

(54) RESOLVING RECORDING CONFLICTS BETWEEN COINCIDING PROGRAMMING

(75) Inventors: Peter J. Potrebic, Calistoga, CA (US); Wei Huang, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1105 days.

(21) Appl. No.: 09/650,801

(22) Filed: Aug. 30, 2000

(51) Int. Cl.
H04N 5/91 (2006.01)

(52) U.S. Cl. ............................ 386/83; 386/45; 386/46; 386/125; 386/126

(58) Field of Classification Search ................... 386/83, 386/85, 95, 46, 1, 96, 125, 126; 395/325; 360/79, 69, 15; 345/721, 716, 719, 810, 345/762, 841; 725/39–45, 140; 348/906, 348/563, 564
See application file for complete search history.

(56) References Cited

U.S. PATENT DOCUMENTS

| | | | | |
|---|---|---|---|---|
| 5,307,173 A * | 4/1994 | Yuen et al. | ..................... | 386/83 |
| 5,686,954 A * | 11/1997 | Yoshinobu et al. | ............ | 725/43 |
| 5,822,123 A * | 10/1998 | Davis et al. | .................... | 725/43 |
| 5,854,887 A * | 12/1998 | Kindell et al. | ................. | 725/86 |
| 5,880,768 A * | 3/1999 | Lemmons et al. | ............. | 725/41 |
| 5,956,455 A * | 9/1999 | Hennig | ......................... | 386/83 |
| 6,208,799 B1 * | 3/2001 | Marsh et al. | .................. | 386/83 |
| 6,240,240 B1 * | 5/2001 | Nagano et al. | ................ | 386/83 |
| 6,344,878 B1 | 2/2002 | Emura | ........................ | 348/460 |
| 6,564,005 B1 * | 5/2003 | Berstis | ......................... | 386/83 |
| 6,642,939 B1 * | 11/2003 | Vallone et al. | ............. | 715/721 |
| 6,650,824 B1 * | 11/2003 | Horlander et al. | ............. | 386/46 |
| 6,756,997 B1 * | 6/2004 | Ward et al. | .................. | 715/716 |
| 7,380,264 B2 * | 5/2008 | Potrebic | ..................... | 725/74 |
| 2002/0095510 A1 * | 7/2002 | Sie et al. | ..................... | 709/231 |
| 2002/0191954 A1 * | 12/2002 | Beach et al. | .................. | 386/46 |
| 2003/0204853 A1 * | 10/2003 | Fries et al. | ..................... | 725/93 |
| 2004/0163130 A1 * | 8/2004 | Gray et al. | .................. | 725/132 |
| 2005/0005300 A1 * | 1/2005 | Putterman et al. | ............. | 725/89 |
| 2007/0039033 A1 * | 2/2007 | Ota | ............................. | 725/115 |
| 2008/0034391 A1 * | 2/2008 | Lehman et al. | ............... | 725/59 |

FOREIGN PATENT DOCUMENTS

EP  0 705 036  4/1996

(Continued)

*Primary Examiner*—Jamie J Atala
(74) *Attorney, Agent, or Firm*—Workman Nydegger

(57) ABSTRACT

A recording system uses electronic program guide information to resolve conflicts between programs that have been selected by a viewer for recording. The recording system allows the viewer to select conflicting (i.e., coinciding) programs for recording, while communicating to the viewer that a conflict exists. Conflicts can be automatically resolved in response to a dynamic change to the recording system, such as an increase in the number of tuners available for recording. Conflicts can also be automatically resolved as senior conflicting programs are taken off the broadcast schedule or are deselected by the viewer. A junior program that conflicts with a senior repeating program can be scheduled for recording by removing from the recording schedule only those instances of the senior repeating program that actually conflict with the junior program, while keeping non-conflicting showings of the repeating program on the schedule. The recording system can also search the electronic program guide for alternate showings of a selected episode of a conflicting program, such that the conflict can be resolved if a non-conflicting showing of the episode is found.

12 Claims, 8 Drawing Sheets

FOREIGN PATENT DOCUMENTS

| | | |
|---|---|---|
| EP | 0 836 320 | 4/1998 |
| JP | 07021619 | 1/1995 |
| JP | 09180292 | 7/1997 |
| JP | 10021601 | 1/1998 |
| JP | 10341381 | 12/1998 |
| JP | 11259927 | 9/1999 |
| JP | 11313280 | 11/1999 |

* cited by examiner

Tuesday 64  78

| Channel | 5:00 | 5:30 | 6:00 | 6:30 | 7:00 | 7:30 |
|---|---|---|---|---|---|---|
| 26 | Real People | Frasier ¤¤ | Friends | Mash | Taxi | Square Pegs |
| 27 | Father Murphy | News Special  o | | Little House | | Ponderosa |
| 28 | 2001 | Citizen Kane | | | | Bonnie Clyde |
| 29 | Nova | | Nature | | Frontline | |
| 30 | Baseball | | | | | Sports News |

FIG. 4A

Wednesday 64a

| Channel | 5:00 | 5:30 | 6:00 | 6:30 | 7:00 | 7:30 |
|---|---|---|---|---|---|---|
| 26 | Real People | Frasier oo | Friends | Mash | Taxi | Square Pegs |
| 27 | Father Murphy | Grizzly Adams | | Little House | | Ponderosa |
| 28 | 2001 | Citizen Kane | | | | Bonnie Clyde |
| 29 | Cosmos | | Wild America | | Frontline | |
| 30 | Soccer | | | | | Sports News |

FIG. 4B

| Channel | 5:00 | 5:30 | 6:00 | 6:30 | 7:00 | 7:30 |
|---|---|---|---|---|---|---|
| 26 | Real People | Frasier ∘∘ | Friends | Mash | Taxi | Square Pegs |
| 27 | Father Murphy | Grizzly Adams | | Little House | | Ponderosa |
| 28 | 2001 | Citizen Kane | | | | Bonnie Clyde |
| 29 | | Nova | | Nature | | Nova ∘ |
| 30 | Baseball | | | | | Sports News |

FIG. 5

| Channel | 5:00 | 5:30 | 6:00 | 6:30 | 7:00 | 7:30 |
|---|---|---|---|---|---|---|
| 26 | Real People | Frasier | Friends | Mash | Taxi | Square Pegs |
| 27 | Father Murphy | Grizzly Adams | | Little House ∘ | | Ponderosa |
| 28 | 2001 | Citizen Kane | | | | Bonnie Clyde |
| 29 | Nova | | Nature | | Frontline | |
| 30 | Baseball | | | | | Sports News |

FIG. 6A

|         | 5:00        | 5:30    | 6:00    | 6:30  | 7:00 | 7:30          |
|---------|-------------|---------|---------|-------|------|---------------|
| Channel | 5:00        | 5:30    | 6:00    | 6:30  | 7:00 | 7:30          |
| 26      | Real People | Frasier | Friends | Mash  | Taxi | Square Pegs   |
| 27      | Father Murphy | Grizzly Adams | | Little House | | Ponderosa |
| 28      | 2001        | Citizen Kane | | | ○ | Bonnie Clyde |
| 29      | Nova        | | Nature | | Frontline | |
| 30      | Baseball    | | | | | Sports News |

FIG. 6B

One Tuner Environment

| Channel | 5:00 | 5:30 | 6:00 | 6:30 | 7:00 | 7:30 |
|---------|------|------|------|------|------|------|
| 26 | Real People ○ | Frasier ○ | Friends | Mash | Taxi | Square Pegs |
| 27 | Father Murphy | Grizzly Adams ¤ | | Little House ¤ | | Ponderosa |
| 28 | 2001 | Citizen Kane ¤ | | | | Bonnie Clyde |
| 29 | Nova ¤ | | Nature ○ | | Frontline | |
| 30 | Hockey Week | Racing Week ¤ | Tennis | | | Sports News |

Order of Selection:
1 - Frasier
2 - Real People
3 - Grizzly Adams
4 - Nova
5 - Nature
6 - Racing Week
7 - Citizen Kane
8 - Little House

FIG. 7A

| Channel | 5:00 | 5:30 | 6:00 | 6:30 | 7:00 | 7:30 |
|---|---|---|---|---|---|---|
| 26 | Real People | Frasier | Friends | Mash | Taxi ¤ | Square Pegs ○ |
| 27 | Father Murphy | News Special | | Little House | | Ponderosa |
| 28 | 2001 | Citizen Kane | | | | Bonnie Clyde |
| 29 | Nova | | Nature | | Frontline | |
| 30 | Baseball | | | | ○ | Sports News |

FIG. 8A

| Channel | 5:00 | 5:30 | 6:00 | 6:30 | 7:00 | 7:30 |
|---|---|---|---|---|---|---|
| 26 | Real People | Frasier | Friends | Mash | Taxi ¤ | Square Pegs ¤ |
| 27 | Father Murphy | News Special | | Little House | | Ponderosa |
| 28 | 2001 | Citizen Kane | | | | Bonnie Clyde |
| 29 | Nova | | Nature | | Frontline | |
| 30 | Baseball | | | | ○ | → |

FIG. 8B

RESOLVING RECORDING CONFLICTS BETWEEN COINCIDING PROGRAMMING

BACKGROUND OF THE INVENTION

1. The Field of the Invention

The present invention relates to recording television programs in connection with an electronic program guide. More specifically, the present invention relates to resolving conflicts between conflicting television programs when the capabilities of the recording system are not sufficient to record all requested programs simultaneously.

2. The Prior State of the Art

For years, home entertainment systems have allowed viewers to record television programs for later viewing. The earliest systems for recording television programs in a viewer's home were video cassette recorders (VCRs) that recorded the audio/video signal received at the viewer's home on a video cassette having a magnetic tape recording medium. In order to record program, the viewer tuned to the appropriate channel, waited for the program to start, and activated the VCR such that the program was recorded on the recording medium. This practice enabled viewers to time shift programs and to watch them at a later time.

Video cassette recorders were soon equipped with programmable systems, which, in response to user input, automatically initiated the recording process to record a program received in the home at a time when the VCR was unattended. Such programmable capabilities enabled viewers to record programming during sleeping hours, while the viewers were away from the home, or at other times when it was not convenient to manually activate the recording process.

During recent years, other recording media in addition to magnetic tape have become available. For instance, it is now common for television programs to be recorded on hard disks in set top boxes associated with televisions. Although different media are now available, the basic concept of recording television programs for later viewing has not significantly changed. Another recent development is the electronic program guide (EPG), which graphically displays television program listings on television screens. FIG. 1 illustrates a graphical user interface associated with an electronic program guide 10. Although there are various EPGs being used today, EPG 10 is a representative example that displays programs in a grid format, in which programs broadcasted on multiple channels in various time slots can be seen and understood at a glance. EPG 10 includes a time index 12 arrayed along one of the row of the EPG 10 and a channel index 14 arrayed along one of the columns of the EPG. In this example, time slots ranging from 5:00 until 7:30 are displayed in time slot index 12, while channel index 14 includes Channels 26-30. In a typical EPG, the viewer can scroll along both axes to learn of television programs being broadcasted at different times and on different channels. By glancing at EPG 10, the viewer can learn, for instance, that the program Grizzly Adams 20 is broadcast on channel 27 in the time slot extending from 5:30 to 6:30.

While EPGs can assist the viewer in identifying when programs are being broadcast, they have also been used to streamline the process of programming recording systems. For instance, a viewer may wish to record the program Friends 16 on Channel 26 at 6:00 upon looking at EPG 10. Depending on the user interface associated with the set top box that includes EPG 10, the viewer may need to the manually program the VCR or another recording system, or use specific features of the user interface of the set top box to program the recording system. In conventional systems that include programming features in the user interface, the viewer may simply be required to select the box or region of EPG associated with the program Friends 16, to indicate that Friends is to be recorded. Alternatively, the viewer may be required to go to a different user interface page or display to cause the recording system to be programmed appropriately. Many viewers have encountered a situation in which they attempt to program the recording system to record one television program that coincides with the broadcast of another program that previously has been selected for recording. For instance, the viewer may have selected the program Friends 16 to be recorded at 6:00 and the program Taxi 18 to be recorded at 7:00. Conventional recording systems can handle this type of request because program 16 and program 18 do not coincide or overlap. If however, the viewer were to later select Grizzly Adams 20 to be recorded, a conflict would be created between program 20 and program 16, since at least part of both programs are broadcasted in the 6:00 time slot.

Some conventional recording systems prohibit the selection of program 20 for recording when program 16 has previously been selected. Accordingly, if the viewer were to attempt to program the recording system to record program 20, the viewer would first have to manually deselect program 16 and then reselect program 20. Other conventional systems allow program 20 to be selected, without indicating that there is a conflict resulting gin the viewer falsely believing that program 20 will be recorded. Each of the foregoing conventional approaches to managing conflicts between coinciding programs has limitations and distracts form the viewer experience. For instance, prohibiting selection of a later program based on a conflict with a previously selected program can cause viewers to have to go through the trouble of manually deselecting the previous program, if desired. In contrast, those conventional systems that enable selection of a conflicting program can mislead viewers into expecting that the most recently selected program will be recorded when, in fact, it will not be recorded.

SUMMARY OF THE INVENTION

The present invention relates to recording systems that enable viewers to select conflicting programming for recording and that determine which of the conflicting programs are to be recorded based on priority rules and any subsequent change in the programming schedule after the programs have been selected. The recording system accepts input from the viewer regarding which programs are to be selected using any available user interface, such as a grid electronic programming guide.

If the viewer selects for recording a program that conflicts with another program that has previously been selected for recording, the recording system accepts the selection and indicates to the viewer that the selected program will not be recorded due to the conflict. Rather than prohibiting the selection of conflicting programs, the recording system accepts the selection of the conflicting program based on the possibility that one of several events could enable the conflicting program to be recorded. Examples of such events include the addition of another tuner to the recording system, deselection of the previously selected program, cancellation of the previously selected program from the programming schedule, etc. In response to such events, the recording system automatically reconsiders which programs can be recorded and schedules the previously-conflicted programs for recording, if possible.

For example, a viewer could select for recording "Program A," which is scheduled to be broadcast at 6:00 p.m. on a particular day. Later, the viewer could select "Program B", which is also scheduled to be broadcast at 6:00 p.m. on the same day. In contrast to conventional recording systems, which prohibit the selection of the conflicting program or require the viewer to manually deselect Program A prior to selecting Program B, the recording system of the invention allows the viewer to select both, while communicating to the viewer that only Program A will be recorded in the absence of further events. If Program A is later canceled from the programming schedule, the recording system automatically determines that it is to record Program B in its place.

The recording systems of the invention can respond to other conflicts in ways that optimize the recording schedule. For example, if the viewer selects a repeating program (e.g., one that is broadcast daily) and then selects a conflicting program that is only broadcast once, the recording system is able to override the selection of the repeating program only on the day when it coincides with the conflicting program. As a result, the later-selected program is recorded on the day when it is broadcast and the repeating program is recorded on a daily basis except for the day on which it coincides with the conflicting program. This approach for resolving conflicts with repeating programs is a significant improvement compared to the method used by prior art recording systems, which would require the repeating program to be entirely removed from the recording schedule in this situation.

The recording systems can also determine whether the episode of one of two or more conflicting programs is scheduled to be broadcast repeatedly during a period of time, such as a day or a week. If the viewer selects for recording a program and episode that is to be broadcast at another time in addition to the selected time, the recording system can resolve conflicts by scheduling the alternate showing of the episode for recording, thereby freeing the original time slot for the recording of the conflicting program.

The recording systems of the invention are adapted for responding to viewer recording selections in ways that resolve conflicts or preserve the possibility of resolving the conflict at a later time. In contrast to conventional recording systems, the recording systems of the invention assist the viewer in recording all programs that are desired in ways that remove from the viewer the burden of fully understanding and reviewing the data contained in the EPG. While not all conflicting programs can be recorded, the recording systems disclosed herein attempt to comply with viewer recording selections as fully as possible.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates the selection of a single instance program that conflicts with a repeating program.

FIG. 4B illustrates an EPG showing the recording system being programmed to record the repeating program of FIG. 4A on another day of the week.

FIG. 5 depicts the selection of an alternate showing of the same episode of a program that conflicts with a previously selected program.

FIG. 6A illustrates the selection of a program that is to be optionally recorded according to one embodiment of the invention.

FIG. 6B illustrates an optional program being overridden by a later selected program.

FIG. 7A illustrates an EPG showing selection of multiple programs for recording in a one tuner environment, where several of the selected programs conflict with other programs.

FIG. 8A illustrates a conflict with a program that may have a variable duration.

FIG. 8B illustrates the manner in which the conflict between selected programs can be resolved if the variable duration program varies from the expected duration according to one embodiment of the invention.

DETAILED DESCRIPTION OF THE INVENTION

The present invention relates to managing conflicts between coinciding programs that have been selected for recording in a recording system. Rather than prohibiting the selection of conflicting programs or, alternatively, allowing the selection of conflicting programs while giving the viewer the false impression that both programs will be recorded, the present invention enables viewers to select any number of conflicting programs and selects the appropriate programs for recording based on defined priority rules. The conflicting status of the programs is communicated to the viewer so that there is no misunderstanding on the part of the viewer regarding which programs are to be recorded. As programs are preempted, as the viewer deselect programs for recording, as the number of tuners in the system changes, and as other events occur, the determination regarding the presence of conflicts is reevaluated and conflicts can be resolved according to various embodiments of the present invention.

Figures 1, 2:
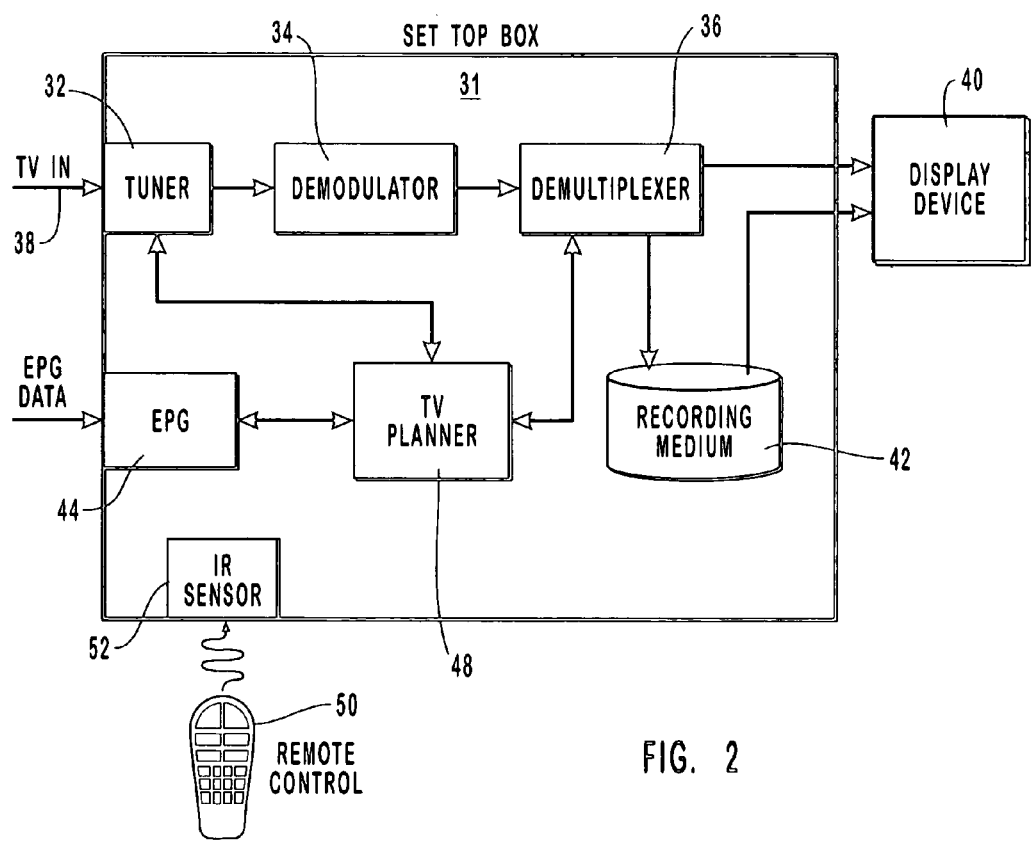
FIG. 1 illustrates an example of an electronic program guide that can assist viewers in selecting programs to be recorded using conventional techniques.
FIG. 2 depicts an exemplary set top box that provides a suitable operating environment for the present invention.

As used herein, the term "coinciding" refers to the broadcast times of two or more programs, each having at least a portion that overlaps with the other broadcast time. "Coinciding" can also refer to the programs having the at least partially overlapping broadcast times. Referring to FIG. 1, the programs Square Pegs and Sports News are entirely coinciding, because both begin at 7:30 and end at 8:00. The programs Citizen Kane and Nature are partially coinciding because the time slots for the two programs are not identical but share common times.

As used herein, the term "program" includes television or other audio/visual content and also extends to the signal that carries the content. When expressed in an EPG, programs typically have a definite, or at least an expected, starting time and ending time.

As used herein, the terms "junior" and "senior" refer to the relative order in which user input is received for the programming recording system to record the programs. For example, referring to FIG. 1, if a viewer were to select program Grizzly Adams for recording, then select the program Citizen Kane for recording, and finally select the program Nova for recording, Grizzly Adams would be a senior program with respect to Citizen Kane and Nova, Citizen Kane would be a junior program with respect to Grizzly Adams and a senior program with respect to Nova, and the program Nova would be a junior program with respect to Grizzly Adams and Citizen Kane.

As used herein, the term "recording system" to refers to any apparatus or system that includes an apparatus for recording programs. Systems that include VCRs, digital video recorders (DVRs), any recording apparatus embodied in a set top box, in a television set, or in another electronics component, a personal computer having recording capabilities, or any other recording apparatus using any type of recording medium represent examples of recording systems.

The invention is described and claimed herein in the context of viewers and users interacting with recording systems. The terms "viewer" and "user" are generally interchangeable. Moreover, the recitation of steps of acts performed by a user or in conjunction with user activity are applicable to actions performed by any one or more users or viewers. There is no requirement that successive steps or acts relating to a user recited in the accompanying claims need to be performed by the same individual.

Embodiments within the scope of the present invention also include computer-readable media for carrying or having computer-executable instructions or data structures stored thereon. Such computer-readable media can be any available media which can be accessed by a general purpose or special purpose computer. Recording systems and set top boxes represent examples of special purpose computers. By way of example, and not limitation, computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, the invention can be described in the general context of computer-executable instructions, such as program modules, being executed by computers such as recording systems and at top boxes. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 2 illustrates exemplary set top box in which the invention can be implemented. Set top box 31 includes components that represent one example of a recording system. Set top box 31 includes a tuner 32, a demodulator 34, and a demultiplexor 36 for receiving a digital television signal 38 and tuning the signal, demodulating the signal, and demultiplexing the signal such that a signal including a particular channel with particular content can be transmitted to display devise 40 and/or recording medium 42. Set top box 31 includes only one tuner, with the result that only one channel can be viewed and/or recorded at any one time. Other set top boxes can have multiple tuners such that multiple channels can be viewed and/or recorded at any given time. Moreover, the components for processing television signal 38 in set top box 31 are adapted to digital television signals, and other set top boxes can have corresponding tuners adapted to for analog television signals.

Set top box 31 of FIG. 2 is an electronic component that is separate from display device 40, which may be a television set. Examples of set top boxes 31 include boxes associated with satellite receivers, cable boxes, interne terminals having television viewing capabilities and the like. In other embodiments, set top box 31 is incorporated with display device 40 to form an integral unit that includes the program recording capabilities disclosed herein in combination with a television set. As noted previously, recording systems for use with invention can be incorporated in set top boxes, DVRs, personal computers, and other electronic devices.

Set top box 31 receives electronic program guide data 44 from any available source. The data is stored in electronic program guide 46, where it is made available to other components of set top box 31 to assist the viewer in selecting programs for recording. The user interface that assist viewers in identifying programs and selecting them for recording is generated by TV planner 48 in combination with EPG 46. TV planner 48, which can be implemented in hardware or software, can generate any desired user interface, examples of which are illustrated in the various accompanying figures. While many of the accompanying figures illustrate an EPG and a recording selection interface having a grid format, the basic features of resolving recording conflicts are not limited to any particular interface. TV planner 48 represents the module set of top box 31 that applies the priority rules disclosed herein to coinciding programs to select those that will be recorded, those that will not be recorded, and to communicate the status of these selected programs to the viewer.

The viewer can interface with set top box 31 and provide user input by means of remote control 50, which transmits electromagnetic signals, such as IR or radio frequency signals, to an IR sensor 52. Signals are communicated to TV planner 48, which applies them to the EPG data stored in EPG 46 to enable to viewer to program the recording system.

Priority Rules and Conflicts

Figure 3A:
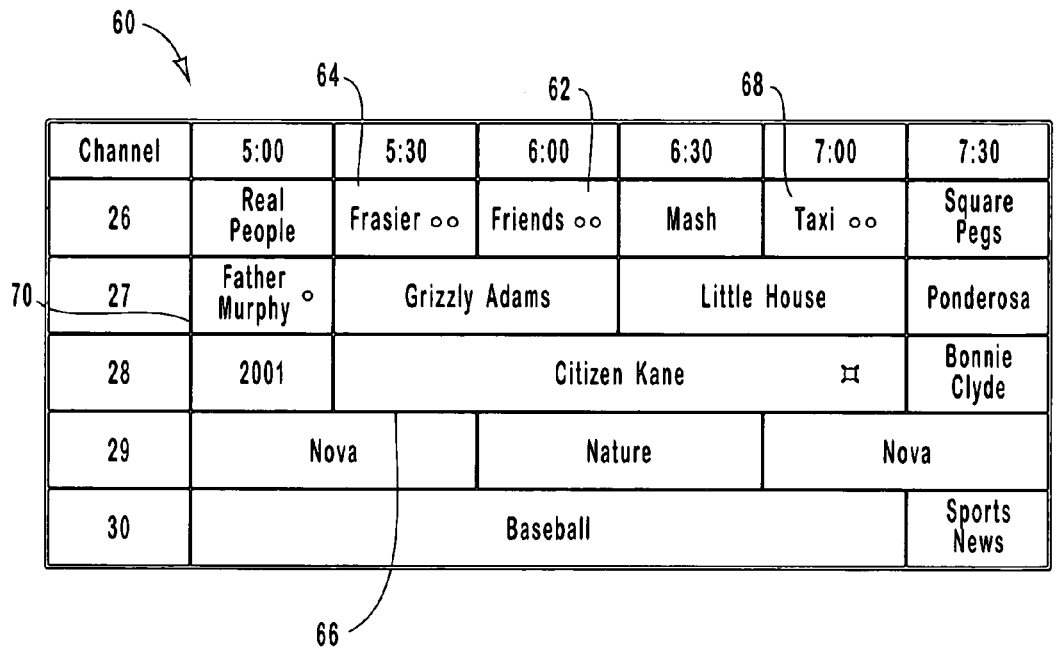
FIG. 3A illustrates an EPG having been used to select programs for recording according to invention, including the selection of conflicting programs.

FIG. 3A represent a user interface that may be displayed to a viewer to assist the viewer in making the program selections for recording, and further illustrates certain programs that have been selected by a viewer. Prior to proceeding with the discussion of how conflicts can be resolved according to the invention, the nature of repeating programs that appear in EPG 60 will first be discussed. In general, a program that appears in an EPG can be repeating or non-repeating. While repeating programs can repeat at various frequencies, three typical types of repeating programs include daily programs, weekly programs, and Monday through Friday (M-F) programs. A daily program is one that is broadcast at a particular time each day of the week, typically for multiple weeks. A weekly program is one that is shown on one day of the week on a weekly basis. A "M-F" repeating program is one that is shown at a particular time only on weekdays, Monday through Friday, of successive weeks. Of course, some programs can repeat at other frequencies. However, for purposes of disclosing the operation of the invention, other frequencies will generally be disregarded herein, since, the principles disclosed herein can apply to repeating programs having any pattern or frequency. An example of a non-repeating program is one that is shown only once or is shown at an irregular or non-predictable frequency.

Television programs have other properties that are relevant various to features of the invention. For instance, some programs have different episodes, whereas other programs are identical each time they are shown. A sitcom is an example of a program that has episodes, as are the programs broadcast on Channel 26 as shown in EPG 60 of the FIG. 3A. A program that has episodes is one that can be different when it is shown at different times in its repetitive cycle. For purposes of this document, regularly scheduled or repeating news programs, talk shows, and the like, are considered to be episodal.

Programs that do not have episodes include those that have only a single showing or those that are identical each time they are shown. For instance, the movie Citizen Kane broadcast on Channel 28 of FIG. 3A is an example of a program that does not have episodes. In other words, each time Citizen Kane is broadcast it is identical to other showings of Citizen Kane. Some programs that are generally episodal in nature can have some non-episodal features. For instance, the single episode of a program can be repeated at a different time of the day, week, or other period of time. One example of the foregoing type of program is shown in FIG. 3A on Channel 29, where a single episode of Nova is shown at 5:00 and is repeated at 7:00. As used herein, the term "showing" refers to single instance of a program being broadcasted on a particular channel. In the example of FIG. 3A, a first showing of an episode of Nova occurs at 5:00 on Channel 29 and a second showing of an episode of Nova occurs at 7:00 on Channel 29.

Many of the accompanying drawings are described in the context of specific examples of programs being selected for recording by a viewer in a specified order. These examples are presented to describe how the various embodiments of the invention respond to various types of conflicts. From theses examples and the accompanying description, general principles of the invention can be understood, and these principles can be applied to other similar conflicts to resolve the conflicts in useful ways that enhance the viewer's experience. The figures are described in the context of a one tuner environment, in which only a single channel can be viewed and/or recorded at any particular time, unless otherwise noted. However, the general principles of the invention are applicable to multiple tuner environments as described herein and as will be understood by those skilled in the art upon learning of this document.

According to one embodiment of the invention, conflicts between selected programs are resolved according to basic default rules:

Rule 1: The most senior program is programmed for recording.

Rule 2: A junior program that does not coincide with any senior program is programmed for recording.

Rule 3: A junior program that does coincide with one or more senior programs is not programmed to be recorded if any of the coinciding senior programs have themselves been programmed for recording.

Rule 4: A junior program that coincides with one or more senior programs is programmed for recording if all of the coinciding senior programs are not programmed for recording.

The foregoing rules are expressed in terms of a single-tuner environment. However, these rules can be adapted to multiple-tuner environments by presuming that a conflict between programs occurs only when the number of coinciding programs exceeds the number of available tuners.

In reference to FIG. 3A, a viewer selects a series of programs for recording in the order shown in Table 1. It is noted that the programs listed in Table 1 and in the other tables of this document are listed in the order in which the viewer has selected them for recording. In other words, a program listed at the top of the table is one that has been selected first by a viewer for recording.

TABLE 1

FRASIER
FRIENDS
CITIZEN KANE
TAXI
FATHER MURPHY

As shown in FIG. 3A, program Frasier (Ch. 2, 6:30) 64 does not conflict with any other program when it is selected for recording. Accordingly, the region of EPG 60 associated with Frasier 64 is modified in some way to indicate that it has been selected for recording and that this program has priority over other programs meaning that the program will be recorded. In this example, program 64 is marked with an icon having two dots signaling that it will be recorded. It is noted that any of a wide variety of user interfaces and techniques for modifying the user interfaces in response to a selection for recording can be used. Moreover, the conflict resolution features of the invention can be practiced with or without a graphical user interface. In this example, and for purposes of this disclosure, a repeating program that has been selected for recording will be designated by two dots, while a non-repeating will be designated by a single dot.

Next, the viewer selects the program Friends (Ch. 26, 6:00) 62 for recording. At the time of its selection, program 62 does not conflict with any previously selected program and will be recorded as indicated by the icon inserted into the region of EPG 60 associated with program 62. Next, the viewer select Citizen Kane (Ch. 28, 5:30-7:30) 66 for recording. The system of the invention recognizes that the program 66 conflicts with senior programs 64 and 62. In other words, program 66 cannot be recorded at the same time as programs 64 and 62 because program 66 coincides with programs 64 and 62. Rather than prohibiting the selection of program 66, the systems of the invention enable the viewer to select program 66 for recording, while indicating to the viewer that, unless further action is taken or unless an unexpected event occurs, Citizen Kane will not, in fact, be recorded. There are many ways of communicating this result to the viewer, one of which is shown in FIG. 3A as the icon consisting of a crossed out dot included in the region of EPG 60 associated with program 66.

At a time that program 66 is selected for recording by the viewer, the viewer can be informed that Citizen Kane will not be recorded because it conflicts with senior programs 62 and 64. Furthermore, the viewer can be instructed to make a decision as to whether the junior program 66 should override the senior programs 62 and 64. If so, the systems of the inventions/respond by deselecting programs 62 and 64 and selecting program 66 for recording. However, in example FIG. 3A, the viewer has declined to override the priority rules, such that programs 62 and 64, rather than program 66, will be recorded. The viewer then selects the program Taxi (Ch. 26, 7:00) 68 for recording. Program 68 coincides with a senior program, namely, program 66. However, because of the priority rules previously applied to program 66, program 66 is not scheduled to be recorded. As a result of no current conflict existing with respect to program 68, recording system is programmed to record program 68. Finally, the viewer selects the program Father Murphy (Ch. 27, 5:00) 70 for recording. Because Father Murphy 70 conflicts with no other selected program, the recording system is programmed to record Father Murphy 70.

If the viewer had indicated that the junior program, Citizen Kane 66, were to override senior programs Friends 62 and Frasier 64, the recording system would continue to indicate that the overridden programs 62 and 64 have been selected for recording, but that they are not currently scheduled to be recorded. For example, turning to FIG. 3A, if the viewer had indicated that Citizen Kane 66 should be recorded, Citizen Kane 66 would be marked with an icon (i.e., a dot without an "x") showing that the program is scheduled for recording and Friends 62 and Frasier 64 would be marked with an icon (i.e., a dot with an "x") showing that these programs have been selected but are not currently scheduled to be recorded.

As illustrated in the foregoing example, as successive programs in a series of programs are selected for recording, the basic default priority rules listed above are applied to the programs to determine which are to be recorded and which are not to be recorded. An example of the application of Rule 1 is that the most senior program, Frasier 64, is programmed for recording. An example of the application or Rule 2 is that the junior program Friends 62 does not conflict with senior program Frasier 64, and is therefore scheduled for recording. An application of Rule 3 is seen at the junior program Citizen Kane 66, which coincides with senior programs Frasier 64 and Friends 62, both of which have been programmed for recording. As specified by Rule 3, Citizen Kane 66 is not scheduled for recording. An application of Rule 4 is illustrated at the junior program Taxi 68, which coincides with a senior program Citizen Kane 66. Because Citizen Kane 66 is not scheduled to be recorded, Taxi 68 has no conflict and is thus programmed for recording according to Rule 4.

Figures 3B, 3C:
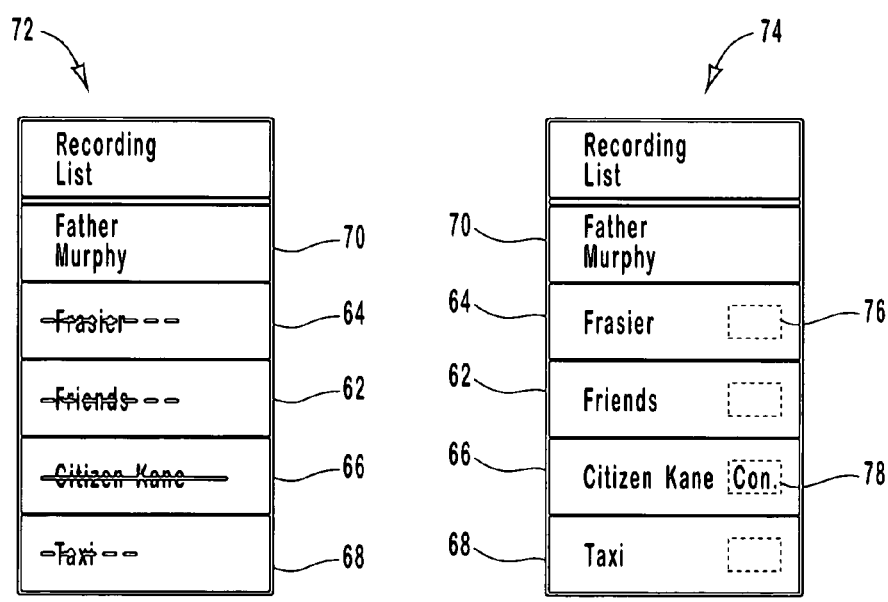
FIGS. 3B and 3C show different versions of a portion of a user interface that illustrates the conflicting nature of the selected programs.

In this embodiment, the recording systems applies the foregoing rules to manage the conflict between selected programs and determine that the programs Friends 62, Frasier 64, and Taxi 68 are to be recorded, whereas Citizen Kane 66 will not be recorded unless the viewer manually overrides the basic conflict rules or unless later changes are made to the program scheduling, such as one of the programs being preempted. FIGS. 3B and 3C illustrated alternative or supplemental portions of the user interface that communicate to the viewer which of the selected programs are to be recorded. In FIG. 3B, the program Father Murphy 70, which does not conflict with any junior or senior program, is displayed without any indication of a conflict in recording list 72. The programs that are scheduled to be recorded, but which do coincide at least partially with a conflicting program, are displayed in recording list 72 with a dashed-line/strike-out format. In this example, these programs are Friends 62, Frasier 64, and Taxi 68. The program, namely Citizen Kane 66, which has been selected for programming, but which is not scheduled to be recorded due to a conflict is displayed with a solid line/strikeout format.

In FIG. 3C, the same programs 62, 64, 66, 68, and 70 are listed in recording list 74 with different formatting indicating conflict or lack of a conflict. In particular, the conflict is indicated by a box 76 or 78 next to the name of the program. The box 76 is rendered with a dashed line, indicating that the associated program is scheduled to be recorded notwithstanding the conflict. The box 78 is rendered with a solid line, indicating that the associated program is not scheduled to be recorded based on a conflict.

Conflicts with Repeating Programs

FIGS. 4A and 4B illustrate the manner in which a conflict between a repeating program and a non-repeating program can be resolved according to one embodiment of the invention. The order in which the programs depicted in FIGS. 4A and 4B are selected for recording is shown in Table 2.

TABLE 2

FRASIER (M-F repeating)
NEWS SPECIAL (non-repeating)

The viewer has selected the program Frasier 64 to be recorded on a repeating basis or, in other words, each time that this program is broadcast during the weekdays, Monday through Friday. The recording system provisionally programs the recording apparatus to record Frasier 64 each weekday, Monday through Friday. After selecting the repeating program Frasier 64 for recording, the viewer selects the non-repeating program News Special (Ch. 27, 5:30-6:30) 78 to be recorded. The recording system recognizes the conflict between the senior repeating program Frasier 64 and the junior program News Special 78.

The resulting conflict can be resolved in one of at least two ways according to different embodiments of the invention. First, the recording system can prompt the viewer to decide whether junior News Special 78 is to override senior Frasier 64. If the viewer indicates that News Special 78 is to be recorded rather than the previously selected Frasier 64, recording system is programmed to record News Special 78. In response to this decision, recording system determines that the particular broadcast of Frasier 64 on Tuesday as shown in FIG. 4A will not be recorded in favor of recording News Special 78. However, other instances of Frasier 64, which are broadcast on days other than the Tuesday on which News Special 78 is broadcast, are not overridden and will remain on the schedule for recording. For example, the instance of the program Frasier 64a, which is broadcast on Wednesday, and which does not conflict with News Special 78, remains scheduled to be broadcast as shown in FIG. 4B. Thus, when the recording system overrides the scheduled recording of a senior repeating program with a non-repeating program, it does so only to the extent necessary to record the non-repeating program. This is in contrast to conventional systems, which would merely enable the viewer to manually resolve the conflict by canceling all current and future scheduled recordings of the repeating program in favor of enabling the recording system to schedule the recording of a single instance of a non-repeating program.

A second option for resolving the conflict of FIG. 4A involves recording system, in response to receiving the input specified in Table 2, automatically determining that the single instance of News Special 78 is to override the conflicting instance of the repeating program Frasier 64. In this embodiment, no user input is required to decide to override the single instance of the repeating program with the selected instance of the non-repeating program. In both of the foregoing embodiments, however, non-conflicting instances of the senior, repeating program remain scheduled to be recorded, such as Frasier 64a in FIG. 4B.

While the scenario described in reference to FIGS. 4A and 4B is one of a junior non-repeating program conflicting with a senior repeating program, similar situations arise when one repeating program having a first frequency conflicts with another repeating program having a different, second frequency. For instance, if the senior program is a daily repeating program, whereas the conflicting junior repeating program is a weekly repeating program (i.e. one shown only once per week), the conflict resolution described in reference to FIGS. 4A and 4B can also be applied to this situation.

In other situations, the senior program is a non-repeating program, while the junior program is repeating. This conflict can be managed in a way similar to that described in reference to FIGS. 4A and 4B by causing the senior, non-repeating program to be recorded as originally scheduled, and by causing each showing of the junior repeating program to be recorded except for the showing that coincides with the senior, non-repeating program.

Repeating Episodes

In example FIG. 5, the viewer has selected programs to be recorded in the order shown in Table 3.

TABLE 3

FRASIER (5:30)
NOVA (5:00-6:00)

As illustrated in FIG. 5, the viewer has selected Frasier 64 for recording. Next, the viewer selects program Nova 80 (Ch. 29, 5:00-6:00) 80 for recording. The recording system recognizes the conflict between Frasier 64 and Nova 80. Nova 80 is one example of a program having episodes that are broadcasted multiple times within a relatively short period of time, such as a single day or a single week. In example of FIG. 5, Nova 80 and Nova 80' represent the same program and the same episode. In situations where a conflicting episode of a program is to be broadcast at another non-conflicting time, the recording system can be programmed to record the non-conflicting episode rather than the conflicting episode, thereby resolving the conflict. In the particular example of FIG. 5, upon the viewer selecting Nova 80 for recording, the recording system is programmed to record Nova 80' (Ch. 29, 7:00-8:00). Because Nova 80' is broadcast later than the episode of Nova 80, the viewer can be informed that an alternate showing of the same episode will be recorded rather than the selected showing. Informing the viewer in the manner avoids confusion on part of the viewer if the viewer were to return to the recording system and attempt to view the recorded Nova 80 at, for instance, 6:30, which is before the alternate showing Nova 80' will be recorded.

While FIG. 5 illustrates separate showings of the same episode occurring on the same channel, the recording system can also examine the EPG to determine if the same episode is to be broadcast on a different channel. One technique for identifying alternate showings of the same episode of a conflicting program is to examine program codes included in many EPG, which uniquely identify episodes of programs. Alternatively, the program description of two entries of the same program can be examined to determine whether it appears that both showings of the program represent the same episode. Those skilled in the art, upon learning of the disclosure made herein, will recognize that alternate showings of the same episode can be identified in any of a variety of ways, all of which can be used with the present invention.

Optional Recording

FIGS. 6A and 6B illustrate the manner in which programs can be selected for optional recording by a viewer in order to enable a program to be recorded if there is no other conflicting program. Turning first to FIG. 6A, the viewer has selected program Little House (Ch. 27, 6:30-7:30) 82 for optional recording. The optional recording status of Little House 82 can be indicated by an open icon 84 displayed on the user interface associated with the electronic program guide. Selecting a program for optional recording has the effect of allowing junior programs to override the scheduled recording of the optional program.

An example of the resolution of conflicts between an optional program and a junior non-optional program is shown in FIG. 6B. As described previously, the viewer has selected Little House 82 for recording and has made that recording optional. The viewer then selects the program Citizen Kane 66 for recording. As shown in FIG. 6B, Little House 82 and Citizen Kane 66 coincide such that only one of the two programs can be recorded. Although Citizen Kane 66 is a junior program, its selection by the viewer for recording overrides the previous selection of Little House 82 for optional recording.

It is possible that the viewer could select two or more coinciding programs for optional recording. While some conventional systems have allowed users to select programs for optional recording, these conventional systems lack the ability to resolve conflicts between coinciding optional programs, as they lack the ability to resolve conflicts between non-optional programs. The recording system of the invention can resolve conflicts between programs selected for optional recording in the manner that is described herein for resolving conflicts between programs that have been selected for non-optional recording.

Dynamic Resolution of Conflicts

FIGS. 7A-7E illustrate alternative approaches for resolving conflicts between programs selected for recording as some of the programs are deselected, or taken off the broadcast schedule, or as the number of tuners in the recording system changes.

Returning first to FIG. 7A, the viewer has selected a series of programs for recording in the order shown in Table 4.

TABLE 4

FRASIER
REAL PEOPLE
GRIZZLY ADAMS
NOVA
NATURE
RACING WEEK
CITIZEN KANE
LITTLE HOUSE

As the viewer selects these programs for recording in the indicated order, the recording system resolves the conflicts according to the basic priority rules such that Frasier 64, Real People 84 and Nature 86 are programmed to be recorded, whereas the other selected programs are not programmed to be recorded. The process of selecting the various programs in FIG. 7A for recording using electronic program guide 100 has been performed while the recording system has one tuner, which enables the recording system to record only one program at a time.

Figure 7B:
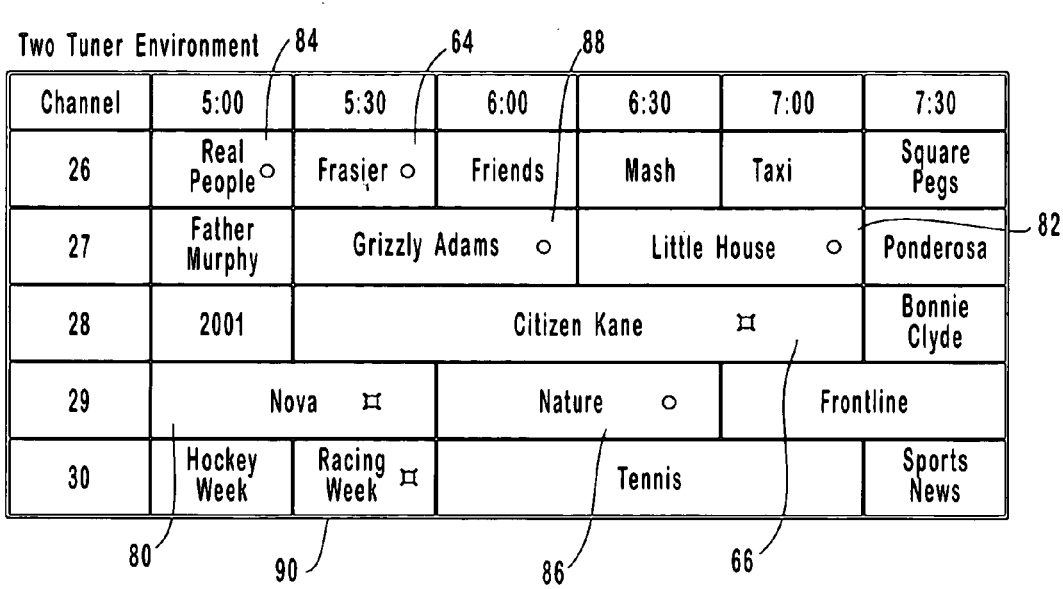
FIG. 7B depicts the EPG of FIG. 7A in two tuner environment.

Turning now to FIG. 7B, the number of tuners available to be used for recording in the recording system has increased to two, by, for example, the viewer upgrading the recording system or adding a second tuner to the recording system. With two tuners, the recording system can now record two programs at any given time. Thus, some of the conflicts that originally existed between programs selected for recording can be resolved by applying the basic priority rules with the modified presumption that a conflict exists only when three or more coinciding programs have been selected for recording. In the example of FIG. 7B, the recording system remains programmed to record Frasier 64, Real People 84 and Nature 86. With the two tuners, the recording system also automatically determines that Grizzly Adams 88 and Little House 82 are to be recorded based on the priority rules and is programmed to achieve this result. In the two tuner environment, Racing Week 90, Citizen Kane 66 and Nova 80 still conflict with senior programs and are not scheduled to be recorded. Thus, as illustrated in FIGS. 7A and 7B, the recording system of the invention can automatically reconsider which conflicting programs are to be recorded when the number of tuners available for recording changes. It is noted that if the viewer were to originally have selected a series of programs for recording in a two tuner environment as shown in FIG. 7B, and if the recording system were subsequently modified to have only one tuner available for recording, the recording system of this embodiment could automatically be reprogrammed to record only those programs shown in FIG. 7A.

Figure 7C:
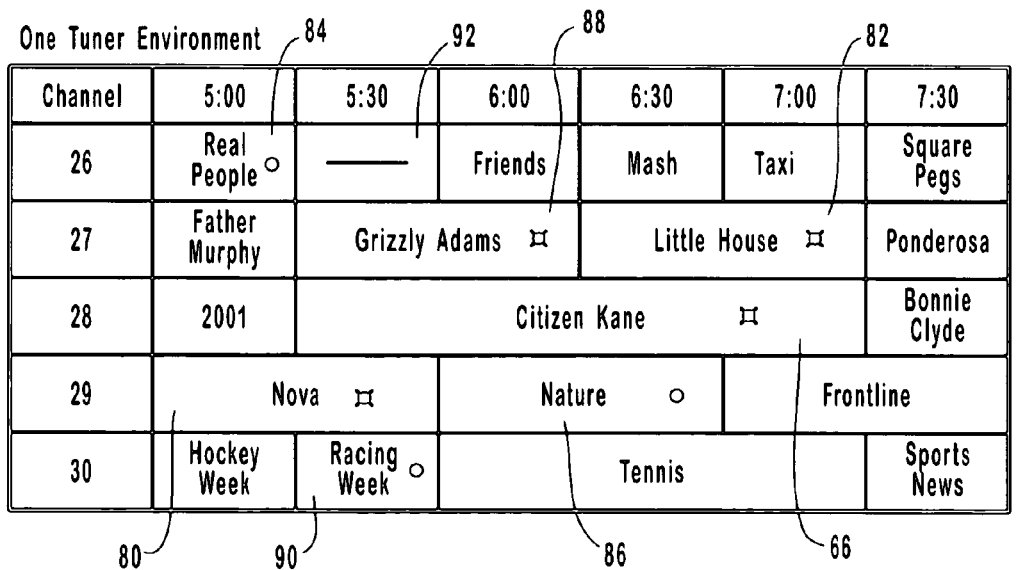
FIGS. 7C through 7E illustrate the manner in which conflicting programs are selected for recording when prior selected programs are preempted or deselected according to various embodiments on the invention.
Figure 7D:
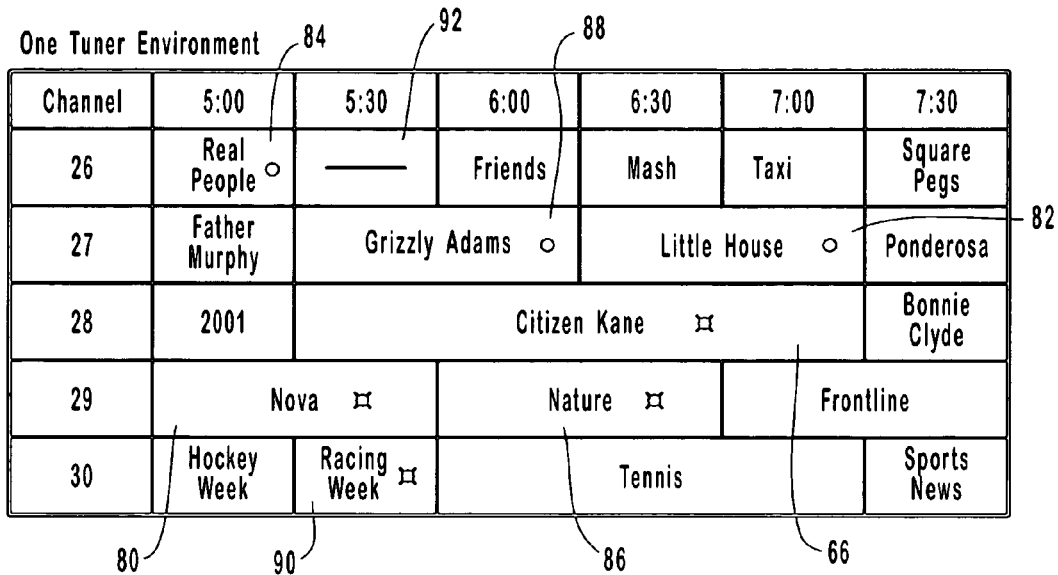
Figure 7E:
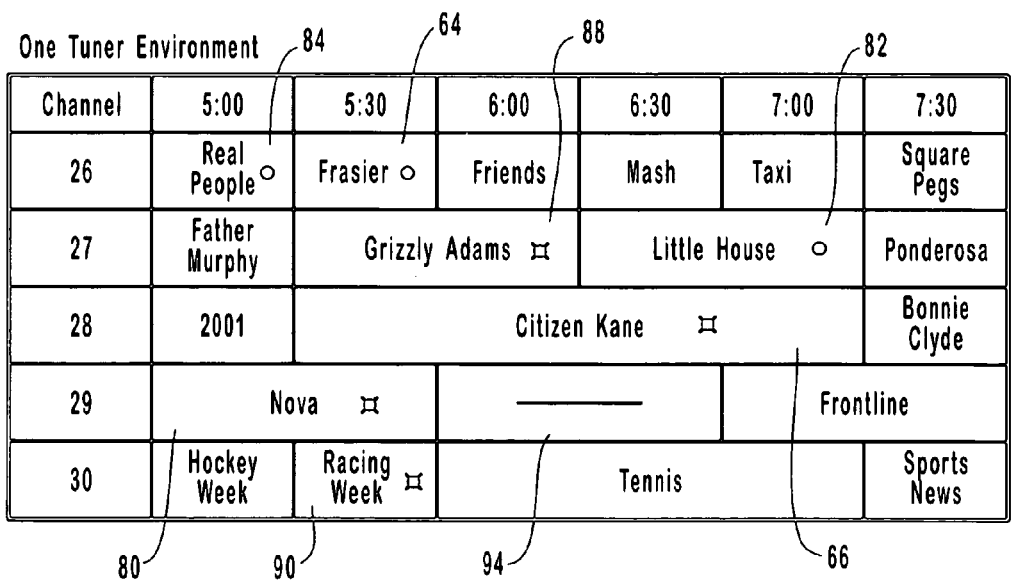

FIGS. 7C-7E illustrate the resolution of conflicts in response to dynamic changes in the programming schedule. As will be discussed in reference to FIGS. 7C and 7D, the elimination of a program from the programming schedule can result in the elimination of previously-existing conflicts, such that the recording system becomes capable of recording some programs that were selected for recording but that were not originally scheduled to be recorded.

In FIG. 7C, the viewer has selected the programs for recording in a one tuner environment as has been previously described in reference to FIG. 7A. After the programs have been selected for recording, Frasier 64 has been eliminated from the programming schedule for any reason as shown by the empty time slot at channel 26 at 5:30 at reference number 92. For instance, Frasier 64 may have been preempted by the operators of channel 26 in favor of other programming.

In order to ensure that programs that were once scheduled for recording as depicted in the electronic program guide are actually recorded, this embodiment of the invention honors the original recording schedule rather than the original order of selection in responding to the dynamic changes in the program schedule. The priority of the selected programs can be changed to ensure that once a viewer is told that a selected program is to be recorded, that program will not be deselected in response to unrelated program schedule changes. In this embodiment, the priority rules are based not on the original order of selection, but instead on the order of selection having been modified by the identity of programs that were originally scheduled for recording. Thus, the priority of the programs for use in this embodiment is shown in Table 5:

TABLE 5

FRASIER
REAL PEOPLE
NATURE
GRIZZLY ADAMS
NOVA
RACING WEEK
CITIZEN KANE
LITTLE HOUSE

Table 5 is an example of a priority list that lists programs first by whether the recording apparatus was originally programmed to record the programs and second in an original order in which the selected programs were selected. It is noted that, in FIG. 7A, Nature 86 was originally scheduled to be recorded, whereas senior programs Grizzly Adams 88 and Nova 80 were not scheduled to be recorded due to their own conflicts. In response to this original determination, the original order of selection shown in Table 4 is modified by advancing Nature 86 to a point superior to all programs that are not selected for recording. Thus, the first three programs in Table 5 are those that were originally scheduled to be recorded and are listed in the relative order of their selection. In addition, the last five programs in Table 5 are those that were originally not scheduled to be recorded and are listed in their relative order of selection.

Returning now to FIG. 7C, the recording system reconsiders which programs are to be scheduled for recording after Frasier 64 is removed from the program schedule. Based on the revised priority order of Table 5, the recording system determines that Real People 84, Nature 86 and Racing Week 90 are to be recorded, whereas Grizzly Adams 88, Nova 80, Citizen Kane 66, and Little House 82 are not to be recorded. It is noted that if the priority list had not been changed based on which programs were originally scheduled to record, the program Nature 86 would have become non-recordable, as will be further described below in reference to FIG. 7D.

The approach of FIG. 7C has the benefit of preserving, to the extent possible, the recording status of programs that were originally communicated to the viewer (e.g., in FIG. 7A) as being recordable. This is typically preferred and is generally the desirable result, since the viewer can rely on the expectation that a particular program that has been indicated as being recordable will be recorded. The tradeoff for preserving the original recording status is that the original order of selection cannot always be honored.

While preserving the original recording status as shown in FIG. 7C is often preferred, the invention can also be adapted to adhere to the original order of selection. For example, in FIG. 7D, after the viewer has selected the programs for recording according to the order shown in Table 4, Frasier 64 has been eliminated from the programming schedule for any reason as shown by the empty time slot at channel 26 at 5:30 at reference number 92. In response to the removal of the senior program, the recording system reconsiders which programs are to be recorded by basing the determination on the original program selection as if the preempted program had never been selected. In this example, the effective order of priority of the remaining programs is shown in Table 6:

TABLE 6

REAL PEOPLE
GRIZZLY ADAMS
NOVA
NATURE
RACING WEEK
CITIZEN KANE
LITTLE HOUSE

Table 6 is an example of a priority list that lists the programs in the original order in which the programs were selected by the viewer. Based on the original priority, with the elimination of Frasier 64, the recording system of this embodiment is programmed to record Real People 84, Grizzly Adams 88 and Little House 82. Programs Citizen Kane 66, Nova 80, Nature 86 and Racing Week 90 will not be recorded, assuming that there are no further changes to the system or the program schedule and that the viewer does not override any of the default recording decisions that have been made by recording system.

Although the original order of selection to the programs is used to reconsider the recording schedule in FIG. 7D, this approach can result in certain programs that were originally scheduled to be recorded to be non-recordable based on conflicts with senior programs. For instance, referring now to FIG. 7A, Nature 86 was originally scheduled to be recorded because there was no senior program that was also scheduled to be recorded. The only senior conflicting program with respect to Nature 86 is Grizzly Adams 88, which itself is not scheduled to be recorded in FIG. 7A due to the nature of its own conflicts. However, with Frasier 64 being removed from the program schedule in FIG. 7C, Nature 86 encounters a conflict with a senior program, namely, Grizzly Adams 88, which is now scheduled to be recorded. For this reason, the program Nature 86 transitions from being scheduled for recording to not being scheduled for recording in response to a senior program being removed from the programming schedule. The adherence to the original order of selection according to this embodiment can sometimes cause the recording system to select programs for recording in ways that are not expected by the viewer. This approach can be a viable alternative to the embodiment of FIG. 7C in some situations, although it is typically not the preferred approach.

FIG. 7E, in conjunction with FIG. 7A, illustrates an example of the dynamic resolution of conflicts in which the results obtained by using either of the foregoing alternate approaches is the same. In FIG. 7E, the viewer has originally selected the programs for recording in the order shown in Table 4. After the programs have been selected, program Nature 86 is removed from the recording schedule as shown at reference number 94. In response to the removal of Nature 86, the recording system reconsiders the programs that can be recorded and determines that Little House 82 does not conflict with any senior program that is also scheduled to be recorded according to either of the approaches that has been described in reference to FIGS. 7C and 7D.

Conflicts Involving Variable Length Programs

FIGS. 8A and 8B illustrate a technique for dynamically resolving conflicts involving at least one program that has a variable length. In this example, the viewer has selected programs to be recorded in the order shown in Table 7:

TABLE 7

BASEBALL
TAXI
SQUARE PEGS

According to the basic rules of priority, Baseball 96 and Square Pegs 98 are scheduled to be recorded, whereas Taxi 68 conflicts with a senior program and is not scheduled to be recorded.

The program Baseball 96 is an example of a program that may have an actual duration that is different from the duration originally specified by the electronic program guide 110, assuming that Baseball 96 has a duration of 2½ hours as shown in FIG. 8A, the recording system will be unable to record Taxi 68, but will be able to record Square Pegs 98. In addition to obtaining electronic program guide data that can be used to construct program schedules in advance for periods of time ranging from several hours to several days, home entertainment systems often receive television signals having encoded therein broadcast data that identifies, on a repetitive or an ongoing basis, the current program and the immediately proceeding program on a particular channel. Such real time guide data is described in greater detail in co-pending U.S. patent application Ser. No. 09/607,394, entitled "RECORDING PROGRAMMING CONTENT USING REAL TIME DATA", which was filed on the same day as this application and is incorporated herein by reference. The real time guide data can be used by the recording system to determine when program Baseball 96 ends to thereby determine whether Baseball 96 actually conflicts with Taxi 68 and Square Pegs 98. For instance, the real time guide data used by the recording system in this embodiment of the invention can include data identifying the currently broadcasted program as being Baseball 96 or as being Sports News 102, which is the immediately following program.

FIG. 8B illustrates a situation in which Baseball 96 lasts longer than was originally scheduled and spills over into the 7:30 time slot originally occupied by Sports New 102 as depicted by arrow 104. It is noted that the graphically displayed electronic program guide 110 typically does not show the unexpectedly long duration of Baseball 96 as illustrated in FIG. 8B. However, the real time data accompanying the broadcast of Baseball 96 can be interpreted to determine, in real time, that Baseball 96 extends into the 7:30 time slot.

A conventional recording system would fail to respond to the unexpectedly long duration of Baseball 96 and would terminate recording of Baseball 96 at 7:30 in favor of recording Square Pegs 98. Indeed, conventional recording systems would record Baseball 96 from 5:00 to 7:30, and then record Square Pegs beginning at 7:30, without regard to any priority between these two programs because there was originally no conflict based on the original electronic program guide information between these two programs.

Rather than simply ignoring the unexpectedly long duration of Baseball 96, the recording systems of the invention can respond to the dynamically created conflict between Baseball 96 and Square Pegs 98 in one of at least two ways. First, the recording system can automatically cause Baseball 96 to be recorded to its end, while foregoing the recording of Square Pegs 98, notwithstanding Square Pegs 98 being a senior program. This approach is useful in that viewers can frequently be frustrated if the end portion of the recorded program, such as Baseball 96, is not recorded. A second technique for resolving such dynamically created conflicts is to monitor the duration of the programs, while honoring the original priority of the programs. In this case, the recording system would determine that the recording of Baseball 96 is to be terminated at 7:30 regardless of any extended duration of Baseball 96 in favor of recording Square Pegs 98.

It is noted that if Baseball 96 were a senior program with respect to Square Pegs 98, the result according to either of the foregoing alternate approaches would be the same. In particular, if Baseball 96 is senior to Square Pegs 98, the recording system of this embodiment of the invention determines that the duration of Baseball 96 extends beyond the expected duration, and continues recording Baseball 96 rather than terminating recording and recording the junior Square Pegs 98.

In some instances, the actual duration of the program can be less than the expected duration. For instance, assume that Baseball 96 in FIG. 8A ended just prior to 7:00. In this case, the recording system of this embodiment of the invention monitors the actual duration of Baseball 96 and terminates recording thereof at the end of Baseball 96, such that Taxi 68 can also be recorded.

While the invention has been described in reference to specific types of conflicts, the general principles for resolving conflicts disclosed herein can be extended to other static and dynamic program schedules and recording systems. In general, the recording systems and methods of the invention respond to conflicts by preserving recording options, communicating the conflicting status of the programs to the viewer, and using the electronic program guide to identify ways in which the viewer's recording wishes can be fulfilled, notwithstanding conflicts that might initially arise.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system that includes a recording apparatus, a method for controlling the recording apparatus in response to programs that have been selected for recording and that have coinciding broadcast times, the method comprising the acts of:

receiving user input from a particular user selecting a first program for recording, the first program having a first broadcast time;

thereafter, receiving user input from the particular user selecting a second program for recording, the second program having a second broadcast time that at least partially coincides with the first broadcast time;

determining that, at the time the user input selecting the second program for recording is received, a conflict exists between the first program and the second program;

at the time the user input selecting the second program for recording is received, and immediately thereafter, abstaining from resolving the conflict;

storing, at the system, a recording list specifying programs specified by the particular user for recording, the recording list including recording information for both the first program and the second program to be recorded, despite the existence of the conflict at the time the user input selecting the second program is received, and immediately thereafter;

the system automatically selecting the first program for recording;

using the recording list to program the recording apparatus to schedule recording of the first program at the first broadcast time;

subsequent to programming the recording apparatus to record the first program at the first broadcast time, continuing to store, at the system, the recording list specifying that the user has selected the second program to be recorded at the second broadcast time which is at least partially coinciding with the first broadcast time, without requiring a user to resolve the conflict, wherein the continued storage preserves the possibility of automatically scheduling the recording of the second program; and in response to a subsequent event, wherein the subsequent event comprises at least one of detecting that a new tuner has been added to the recording apparatus or detecting that at least one of a start or stop time for the first program has changed from the first broadcast time, automatically programming the recording apparatus to schedule recording of the second program at the second broadcast time, using the stored recording information specifying that the user has selected the second program to be recorded, and without requiring the user to reselect the second program to be recorded.

2. A method as recited in claim 1, further comprising the act of communicating to the user information specifying that the conflict exists and that the second program is to be recorded only if the conflict is resolved prior to the second broadcast time.

3. A method as recited in claim 1, wherein the subsequent event comprises the first program being preempted such that the first program is not broadcast at the first broadcast time.

4. A method as recited in claim 1, wherein the subsequent event comprises at least one of a start time and an end time of at least one of the first program and the second program changing from that which was scheduled, such that no portion of the first program coincides with any portion of the second program.

5. A method as recited in claim 4, wherein the subsequent event comprises the act of analyzing broadcast data broadcast on a channel that includes one of the first program and the second program, the broadcast data identifying said at least one of the start time and the end time of said at least one of the first program and the second program.

6. In a system that includes a recording apparatus, a method for resolving conflicts between programs that have been selected for recording and have coinciding broadcast times, the method comprising the acts of:

receiving, from a particular user, input selecting a first program for recording, the first program having a first broadcast time;

receiving, from the particular user, input selecting a second program for recording, the second program having an expected second broadcast time having an expected start time and an expected end time, wherein the expected broadcast time at least partially coincides with the first broadcast time, thereby creating a conflict between the first program and the second program;

at the time the user input selecting the second program for recording is received, and immediately thereafter, abstaining from resolving the conflict between the first program and the second program;

storing, at the system, a recording list specifying all programs to be recorded, the recording list being usable to program the recording apparatus to record listed programs, the recording list further including recording information indicative that input has been received from the particular user selecting both the first program to be recorded at the first broadcast time and the second program to be recorded at the expected second broadcast time, despite the existence of the conflict existing at the time the user input selecting the second program is received, and immediately thereafter, the conflict existing inasmuch as the expected second broadcast time at least partially coincides with the first broadcast time, and wherein the recording list can be displayed at any time by the particular user and displays only programs selected by the particular user to be recorded, while further visually distinguishing between programs which are:

selected for recording, involved in a conflict with another program selected for recording, and scheduled for recording;

selected for recording, involved in a conflict with another program selected for recording, and not scheduled for recording; and selected for recording and not involved in a conflict with another program selected for recording;

continuing to store, at the system, the recording list specifying that input has been received selecting both the first program and the second program to be recorded at the first broadcast time and the expected second broadcast time, respectively, and while the first broadcast time and the expected second broadcast time conflicted at the time the user input selecting the second program was received, and immediately thereafter;

monitoring broadcast data on a channel on which the second program is to be broadcast to determine that at least one of an actual start time and an actual end time differs from the respective expected start time and expected end time; and upon determining that at least one of an actual start time or an actual end time of an actual second broadcast time differs from the respective expected start time and expected end time, determining whether both the first program and the second program can be recorded as a result of the actual broadcast time and the first broadcast time not coinciding and using the stored recording information of the recording list specifying that input has been received selecting both the first program and the second program to be recorded, and, if so, recording both the first program and the second program using the recording apparatus.

7. A method as recited in claim 6, wherein the first broadcast time does not coincide with the expected second broadcast time and the first broadcast time at least partially coincides with an actual second broadcast time defined by the actual start time and the actual end time, such that:

the act of determining whether both the first program and the second program can be recorded results in a determination that one of the first program and the second program cannot be recorded.

8. A method as recited in claim 7, further comprising the act of recording all of the second program during the actual second broadcast time as opposed to recording only that portion of the second program that is broadcast during the expected second broadcast time.

9. A method as recited in claim 6, wherein the first broadcast time at least partially coincides with the expected second broadcast time and the first broadcast time does not coincide with an actual second broadcast time defined by the actual start time and the actual end time, such that:

the conflict between the first broadcast time and the expected second broadcast time is resolved and both the first program and the second program are recorded.

10. A method as recited in claim 1, further comprising the acts of:

receiving user input selecting a third program for recording at a third broadcast time; and prior to the act of programming the recording apparatus to record the second program and in response to the subsequent event reconsidering which of the selected programs including the second program and the third program, are to be recorded, using a priority list that lists the programs in an original order in which the selected programs were selected.

11. A method as recited in claim 1, further comprising the acts of:

receiving user input selecting a third program for recording at a third broadcast time; and prior to the act of programming the recording apparatus to record the second program and in response to the subsequent event, reconsidering which of the selected programs, including the second program and the third program, are to be recorded, using a priority list that lists the selected programs first by whether the recording apparatus was originally programmed to record the selected programs and second in an original order in which the selected programs were selected.

12. In a system that includes a recording apparatus, a method for controlling the recording apparatus in response to programs that have been selected for recording and that have coinciding broadcast times, the method comprising the acts of:

at an electronic program guide (EPG) receiving user input from a particular user selecting a first program for recording, the first program being repeated at a first regular frequency, and an instance of the first program having a first broadcast time;

thereafter, receiving user input at the EPG, and from the particular user, selecting a second program for recording, the second program being repeated at a second regular frequency, and an instance of the second program having a second broadcast time that at least partially coincides with the first broadcast time;

determining that, at the time the user input selecting the second program for recording is received, a conflict exists between the instance of first program and the instance of the second program;

at the time the user input selecting the second program for recording is received, and immediately thereafter, abstaining from resolving the conflict;

storing, at the system, a priority list specifying all programs selected by the particular user for recording, the priority list including recording information for both the first program and the second program to be recorded, despite the existence of the conflict at the time the user input selecting the second program is received, and immediately thereafter, wherein the priority list is selectable by the particular user for display and, when displayed, displays only programs selected by the particular user for recording, while further including different visual identifiers for each of:

programs selected for recording, involved in a conflict with another program selected for recording, and scheduled for recording;

programs selected for recording, involved in a conflict with another program selected for recording, and not scheduled for recording; and programs selected for recording and not involved in a conflict with another program selected for recording;

the system automatically selecting the instance of the first program for recording and using the priority list to program the recording apparatus to schedule recording of the instance of the first program at the first broadcast time, wherein automatically selecting the instance of the first program and programming the recording apparatus includes applying a default rule set including at least the following rules for a single tuner:

program a most senior, non-optional program for recording;

program a junior program for recording when it does not conflict with senior programs;

program a junior program for recording when it only conflicts with one or more senior, optional programs;

program an optional program for recording when it does not conflict with any other program;

program an optional program for recording when it only conflicts with one or more junior, optional programs;

not program a junior program for recording that conflicts with one or more senior programs which have been programmed for recording; and program a junior program for recording that conflicts with one or more senior programs when all of the conflicting senior programs are not programmed for recording;

updating the EPG to reflect which programs and instance of programs are scheduled for recording, wherein the EPG includes different visual identifiers for each of:

repeated programs selected for recording and scheduled for recording;

non-repeated programs selected for recording and scheduled for recording;

programs selected for recording and not scheduled for recording;

programs selected for optional recording; and programs not selected for recording;

subsequent to programming the recording apparatus to record the instance of the first program at the first broadcast time, continuing to store, at the system, the priority list specifying that the user has selected the second program to have its instance recorded at the second broadcast time which is at least partially coinciding with the first broadcast time, without requiring a user to resolve the conflict, wherein the continued storage preserves the possibility of automatically scheduling the recording of the instance of the second program; and after programming the recording apparatus to record the instance of the first program, detecting that a new tuner has been added to the recording apparatus, and thereafter automatically programming the recording apparatus to schedule recording of the second program using the stored recording information specifying that the user has selected the second program to be recorded without requiring the user to reselect the second program to be recorded, such that instance of the first program is recorded at the first broadcast time and the instance of the second instance is recorded at the second broadcast time.

* * * * *